April 28, 1959     J. H. DRAPER, JR     2,883,734
PAPER-MAKER'S WET FELT
Filed Nov. 10, 1955
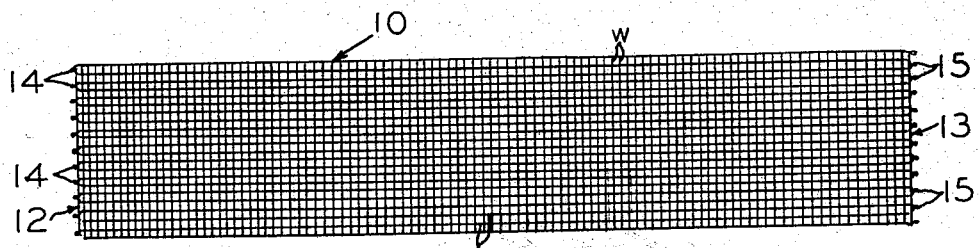
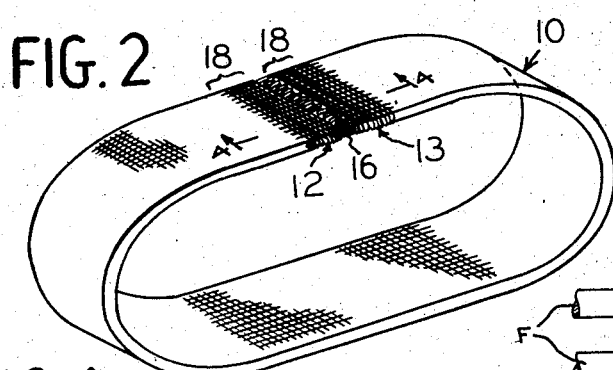
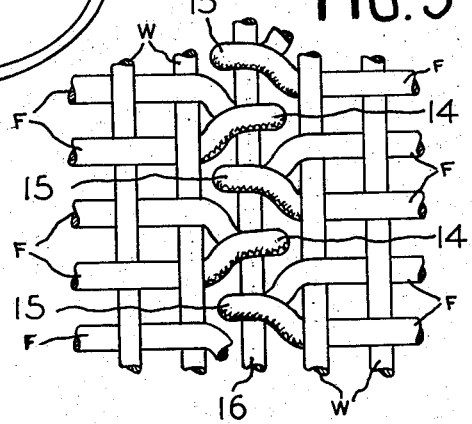
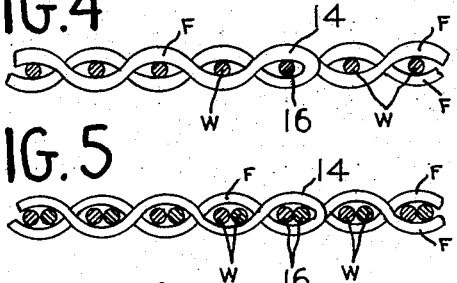
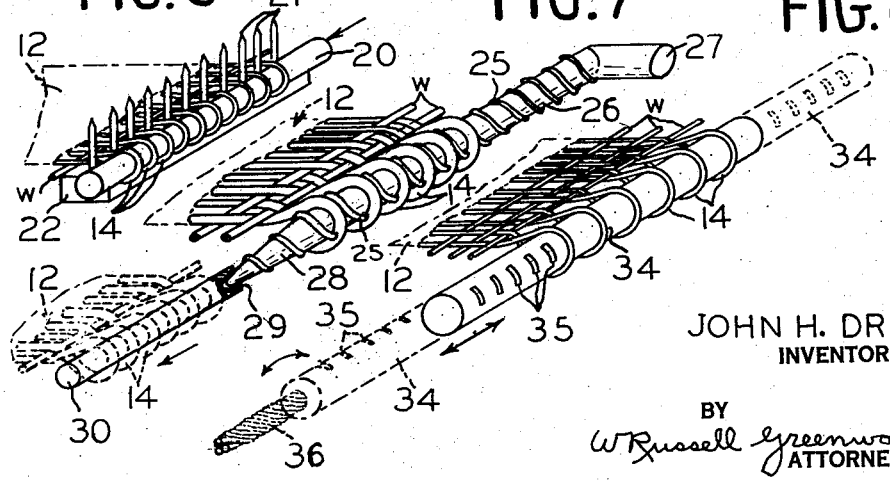
JOHN H. DRAPER, JR
INVENTOR
BY W. Russell Greenwood
ATTORNEY

United States Patent Office 2,883,734
Patented Apr. 28, 1959

2,883,734

PAPER-MAKER'S WET FELT

John H. Draper, Jr., Canton, Mass., assignor to Draper Brothers Company, Canton, Mass., a corporation of Massachusetts Application November 10, 1955, Serial No. 546,195

6 Claims. (Cl. 28—72)

This invention relates to paper-maker's wet felts and, more particularly, to a novel joint construction for paper-maker's wet felts woven in open-ended strip form, and to the method of forming the joining ends of such a felt strip to insure accurate and rapid fitting together of such ends for being secured together to provide said joint and to produce an endless belt structure of said felt.

In conventional paper-making machines, wet felts as used therein are in the form of a porous driving and conveyor belt which helps to form and convey the sheet of paper, paper-board, etc., from the wire or cylindrical mould through various water-removing equipment such as press rolls, suction boxes, etc., and delivers the paper, paper-board, etc., that is being produced to the drier section of the machine. Such wet felts usually are woven endless and applied in such condition to the associated rolls of the paper-making machine. The installation of endless woven wet felts in the paper-making machine has required cessation of operations thereof while some of the heavy press rolls are removed thus necessitating expenditure of a good deal of time and labor with a resultant loss in production of the machine.

It accordingly is one object of this invention to provide for use on paper-making machines, a wet felt of a woven open-ended strip construction which may be made endless by joining together yarn extensions of the weave system of the felt at the joining ends thereof after fitting of the felt around the usual rolls with which it operates.

Another object of this invention is the provision of a seam or joint construction for a paper-maker's wet felt wherein yarn extensions at the joining ends of the felt and continuous with the weave system thereof are used for joining together the two ends of the felt, and a textile yarn or cord is used to secure both sets of yarn extensions together and retain the two ends of the felt connected together to form an endless belt structure.

A further object of the invention is the provision of a method and means of effecting and maintaining the yarn extensions spaced a predetermined distance apart across the joining ends of the felt preparatory to the joining of the two ends of the felt whereby the yarn extensions thereof may be quickly interfitted together and the connection of the felt ends readily made upon the paper-making machine with a minimum expenditure of time and labor.

According to the present invention the foregoing difficulties of prior endless woven wet felts are eliminated by providing the wet felt in a woven open-ended form having the joining or terminal ends thereof formed with sets of integral interfitting loops through which a transverse yarn or cord connector is passed to secure the two sets of loops connected together in an interfitting or intermeshed relation. The loops are formed during weaving of the filling yarns to make the woven open-ended fabric structure which, after weaving, is subjected to a preliminary treatment of fulling and shrinking. The felt is made endless, after being applied around the working rolls of the machine, by having the two terminal ends of the felt brought together in substantially abutting relation with the set of loops at one end in interfitting or intermeshing relationship with the set of loops at the other end, and then mutually connecting the intermeshed loops together by a transverse yarn or cord of suitable material, preferably nylon, to produce an extremely strong joint which is durable enough to have satisfactory life yet one which will have sufficient stiffness to keep the loops from pulling apart, and at the same time possess the necessary resiliency to pass between the press rolls. The arrangement of this joint also is made such that it will be porous enough to allow for movement of water therethrough when necessary. The loops of each set are spaced a predetermined distance apart from one another across the associated end edge of the felt. In order to facilitate the intermeshing of both sets of loops properly and quickly the loops are temporarily held fixed in their predetermined spacings by means of a suitable stiffening agent which can be removed readily with water when the felt is wet down in the machine.

The invention now will be described with reference to the accompanying drawing in which:

Fig. 1 is a diagrammatic plan view of a wet felt constructed in accordance with this invention and showing the flat open-ended web form in which it is manufactured with the two sets of interfitting loops at the opposite terminal ends of the felt for joining these ends together to make the felt endless;

Fig. 2 is a prespective view of the wet felt web shown in Fig. 1 made endless with the two ends thereof joined together by a joint construction made in accordance with this invention;

Fig. 3 is a fragmentary plan view, on greatly enlarged scale, of a portion of the seam or joint construction of the endless wet felt assembly shown in Fig. 2, and shows particularly the cord connector means joining the terminal end loops of the felt together;

Fig. 4 is an enlarged fragmentary vertical section on the line 4—4 of Fig. 2 looking in the direction of the arrows;

Fig. 5 is an enlarged fragmentary vertical section transversely through a joint similar to that shown in Fig. 4 but differing therefrom by showing a modified type of weave employing two warp yarns and use of two cord connectors joining the terminal end loops of the felt to form the joint connection according to the present invention;

Fig. 6 is a fragmentary pictorial view showing one method of obtaining a predetermined spacing of the loops at the ends of the felt, and preparatory to being set by a stiffening agent;

Fig. 7 is a fragmentary pictorial view depicting another method of effecting a predetermined spacing of the connector end loops of the wet felt and preparatory to being set by a stiffening agent; and Fig. 8 is a fragmentary pictorial view depicting still another method of effecting a predetermined spacing of the connector end loops of the wet felt, and preparatory to being set by a stiffening agent.

Referring to the drawings, the reference numeral 10 generally designates a paper-maker's wet felt which is used for forming, supporting, conveying and draining the wet paper-making material as it progresses to the condition of a pulp in the paper-making machine, and may be of any of the well known woven woolen fabric structures, with or without use of other yarns composed of either natural or synthetic fibers in either the warp or filling system of the woven felt. After weaving, such woven fabric or felt 10 is subjected to a preliminary treatment of fulling, thereby shrinking and compacting the woven structure as much as possible to closely draw the threads together. Thereafter, it may be subjected to a teazeling or other finishing operations regularly performed in the manufacture of paper-maker's felts. These operations are well known in this art so that no detailed or further description thereof is deemed to be necessary.

As illustrated in Fig. 1 of the drawing, reference numerals 12 and 13 designate the two ends of the felt 10 which are to be joined together. The respective ends 12 and 13 of the woven fabric have projecting end loops 14 and 15 which are formed of the filling yarns in the woven fabric. In Figs. 1, 3 and 4, the weave of the woven felt consists of a warp yarn system of single warp yarns W and a filling yarn system of single filling yarns F. The felt 10 is woven as a wide flat fabric which is delivered to the paper-maker open-ended in a fulled and shrunk condition after the preliminary treatment above-mentioned for installation in the paper-making machine. To place the felt in service, it is fitted around the usual cylinders and the terminal ends 12 and 13 of the fabric thereafter brought together into juxtaposition and the loops 14 of the terminal end 12 interfitted between the loops 15 of the other terminal end 13 after which the two sets of interfitted end loops are connected together by passing therethrough a transverse yarn or cord connector medium indicated at 16, such as a single "all-nylon" yarn or cord, so as to securely join these terminal ends together and thereby form a continuous endless belt structure, as clearly indicated in Figs. 2, 3, and 4.

In Fig. 5 there is illustrated another weave for a felt in which the warp yarn system employs two warp yarns W and a single filling yarn F and the end loops 14 and 15 are connected together by two "all-nylon" yarns or cords to produce the endless belt structure.

The loops 14 and 15 which were formed originally of filling yarns in the initially woven fabric structures of Figs. 4 and 5 now assume a warpwise position running lengthwise in the completed wide endless belt structure with the original warp yarns running transversely thereof when the two terminal ends of the felt fabric are joined together in accordance with this invention.

In preparing the ends of the woven open-ended felt 10 for joining, the marginal edge portions of the respective terminal ends 12 and 13, about four to six inches inwardly thereof, as indicated at 18, and including the two sets of loops 14 and 15 at the respective felt ends, are starched, thus stiffening the loops and maintaining them in thus-spaced positions to facilitate the placement together of the two sets of projecting loops in an interfitting or intermeshed relation one with the other for mutual connection by insertion therethrough of the transverse yarn or cord 16. The loops 14 and 15 of the respective sets preferably are made as short as possible according to the requirements of the fabric structure whereby the resultant seam will be smooth and lie in a plane substantially coincident with the outer or paper-carrying surface of the terminal ends of the felt thus providing a continuous flat supporting surface throughout the length of the felt for carrying the wet paper material and one which will not mark or indent the pulpy mass carried by the felt to a minimum degree. The projecting loops 14 and 15 are equally spaced apart a predetermined distance across the terminal ends 12 and 13 respectively of the felt to provide the correct orientation of the loops for permitting them to be readily intermeshed together.

This accurate spacing of the loops of each set may be effected in several different ways such as, for example, by the methods illustrated in Figs. 6, 7 and 8 respectively. In Fig. 6, a cylindrical rod 20 is passed through all the loops 14 or 15 which are maintained a predetermined distance apart one from the other on the rod by means of a series of upright pins 21 carried by a suitable support 22 at equally spaced intervals therealong. The pins 21 pass between and separate the adjoining loops 14 or 15 transversely across the ends 12 or 13 respectively of the felt.

In Fig. 7, there is illustrated another arrangement for obtaining predetermined spacing of the loops 14 or 15, as the case may be, in which the set of loops 14 or 15 are separated by the convolutions of a helical spring 25 which is fast upon a central cylindrical rod member 26 and is rotatable therewith as the latter is manually revolved by means of the handle 27. The forward end of the rod 26 is tapered to a point as indicated at 28 to engage within the recessed upper end portion 29 of a pilot rod 30 on which loops 14 or 15 have been previously threaded. As the rod 26 is turned the helical spring 25 rotates therewith engaging successively loops 14 or 15 thereby producing a predetermined spacing thereof in advancing across the entire width of the felt and pushing the pilot rod 30 before it to open the loops preparatory for threading onto the rod 26. It will be understood that in the practice of the Fig. 7 method, the loops at one joining end of the felt will be produced with a Z twist while those at the other joining end will have an S twist whereby the two sets of loops may be fitted together quickly.

Fig. 8 shows a further method of obtaining a predetermined spacing of the loops 14 or 15 wherein there is employed an extendable sectional rod member 34 which is provided on a portion of its outer cylindrical surface with a series of notches 35 spaced apart at equal predetermined distances along the rod. One section of the rod 34 first is inserted with its smooth cylindrical surface portion through the set of loops 14 or 15 and pulled lengthwise therethrough by means of a cable 36, with additional similar rod sections 34 being added and suitably connected together until the rods extend across the entire width of the felt and all the loops 14 or 15 are supported upon the rod sections 34 after which the rod assembly is revolved within the loops until all the notches 35 are occupied by the curved outer bends of the loops thereby retaining them spaced apart a definite distance one from the other.

While thus-held in all three of the above-described arrangements of Figs. 6, 7 and 8, the loops 14 or 15 and their adjacent marginal end edge portions 18 (see Fig. 2) are stiffened temporarily with a soluble stiffening substance, such as by the starching treatment previously mentioned and for the purpose there-explained. The soluble stiffening agent preferably is one which can be removed readily with water when the felt is wet down in the machine after the felt has been applied around its working rolls and the two ends of the felt joined together in accordance with the invention. The joint thus produced after removal of the stiffening agent will be flexible and have the necessary resiliency to pass between the press rolls.

In the foregoing description, where the terms "paper-making machine" and "paper-making materials" have been used they are meant to include this type of machine when running on other types of materials also, such as boxboard, leatherboard, asbestos cement products, roofing paper, etc.

The term "all-nylon" is used herein to imply that the yarn or cord connector passing through the interfitted loops of the opposed ends of the felt web to make the latter endless consists of pure nylon filaments or threads twisted together to form a plied strand of the desired size, and to exclude for such purpose a plied strand of twisted compound yarns of staple length nylon mixed with a natural textile fiber.

While specific forms of the invention are disclosed herein, yet modifications can be made without departing from the spirit of the invention, and those modifications that fall within the scope of the appended claims are intended to be included herein.

What is claimed is:

1. A paper-maker's felt for supporting and draining wet paper-making material comprising a fulled, shrunk and felted flat-woven fabric having projecting integral end loops formed of the filling yarns in said fabric with said looped filling yarns running lengthwise in the finished felt and said warp yarns running transversely thereof when the terminal end edges of the fabric subsequently are brought into juxtaposition for said loops to be connected together to form an endless belt structure, said loops and the adjacent marginal portions of the felt ends temporarily incorporating a soluble stiffening substance whereby the loops will be retained in correct alignment for interfitting assembly when the felt ends are brought together for joining.

2. The method of forming a series of fixed predetermined spaced loops at the terminal ends of a paper-maker's wet felt for connecting said ends of the felt together which comprises assembling all the loops on a common support passing transversely therethrough, mechanically separating adjacent loops and retaining them spaced apart a predetermined distance one from the other, and thereafter subjecting the thus-spaced loops on said support and the contiguous marginal portions of the terminal ends of the felt to a treatment with a stiffening agent to temporarily hold said loops fixed in such predetermined spaced relationship when removed from said support preparatory for joining the two ends of the felt by said loops to make it endless.

3. The method of forming a series of fixed predetermined spaced loops at the terminal ends of a paper-maker's wet felt for connecting said ends of the felt together, as claimed in claim 2, in which the mechanical separation and retention of said loops in a predetermined spaced relationship one from the other is effected by means of a series of upright pins carried in predetermined equally spaced intervals along a supporting member and projecting through the spaces between adjoining loops behind the common support for said loops.

4. The method of forming a series of fixed predetermined spaced loops at the terminal ends of a paper-maker's wet felt for connecting said ends of the felt together, as claimed in claim 2, in which the mechanical separation and retention of said loops in a predetermined spaced relationship one from the other is effected by means of a helical spring encompassing the common support for said loops and having its convolutions disposed between adjoining loops.

5. The method of forming a series of fixed predetermined spaced loops at the terminal ends of a paper-maker's wet felt for connecting said ends of the felt together, as claimed in claim 2, in which the mechanical separation and retention of said loops in a predetermined spaced relationship one from the other is effected by means of said common support passing through said loops and having predetermined spaced notches on its surface in which portions of said loops are accommodated and held at such spacing while being subjected to said stiffening treatment.

6. A paper-maker's felt comprising a flat woven fabric of warp and filling yarns having its distal end extremities each provided with a series of projecting integral end loops formed of the filling yarns in said fabric, said looped filling yarns extending lengthwise throughout the fabric structure and said warp yarns running widthwise thereof when the opposite terminal ends of said felt subsequently are brought together into a juxtaposed position effective for said loops to be connected together to form an endless belt structure, said end loops of the series at one end of said felt being disposed in a predetermined spaced relationship to each other and also to those of the series at its opposed end and being held in a stiffened state by temporarily incorporating a water-soluble stiffening substance whereby the loops will be retained firmly in correct position for interfitting assembly when the felt ends are brought together for joining, the series of said stiffened end loops at one terminal end of said felt all having a Z-twist and the series of stiffened end loops at the other terminal end of the felt all having an S-twist.

References Cited in the file of this patent
UNITED STATES PATENTS

| | | |
|---|---|---|
| 340,335 | Lindsay | Apr. 20, 1886 |
| 758,572 | Werk | Apr. 26, 1904 |
| 926,004 | Keller | June 22, 1909 |
| 1,320,996 | Turner | Nov. 4, 1919 |
| 2,106,119 | Krasselt | Jan. 18, 1938 |
| 2,158,007 | Ellis et al. | May 9, 1939 |
| 2,540,874 | Geddings | Feb. 6, 1951 |
| 2,748,445 | Skeer et al. | June 5, 1956 |